(12) United States Patent
Chi

(10) Patent No.: US 9,246,430 B2
(45) Date of Patent: Jan. 26, 2016

(54) METHOD FOR CONTROLLING AN INVERTER

(71) Applicant: LSIS CO., LTD., Anyang-si, Gyeonggi-do (KR)

(72) Inventor: Min Hun Chi, Gunpo-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 231 days.

(21) Appl. No.: 13/762,154

(22) Filed: Feb. 7, 2013

(65) Prior Publication Data

US 2013/0207582 A1 Aug. 15, 2013

(30) Foreign Application Priority Data

Feb. 10, 2012 (KR) .................. 10-2012-0013864

(51) Int. Cl.
*H02H 7/08* (2006.01)
*H02P 27/06* (2006.01)
*H02P 23/00* (2006.01)

(52) U.S. Cl.
CPC ............ *H02P 27/06* (2013.01); *H02P 23/0086* (2013.01)

(58) Field of Classification Search
USPC ................................. 318/400.01, 400.21, 700
See application file for complete search history.

(56) References Cited

U.S. PATENT DOCUMENTS

2009/0132116 A1* 5/2009 Tanaka et al. ................... 701/36
2009/0205887 A1* 8/2009 Tanaka ...................... 180/65.22

FOREIGN PATENT DOCUMENTS

| CN | 1604455 | 4/2005 |
|---|---|---|
| CN | 201167296 | 12/2008 |
| JP | 60-043096 | 3/1985 |
| JP | 01-097760 | 4/1989 |
| JP | 2001-037281 | 2/2001 |
| JP | 2001-157479 | 6/2001 |
| JP | 2006-067668 | 3/2006 |
| JP | 2006271038 | 10/2006 |
| JP | 2007008714 | 1/2007 |
| JP | 2007050976 | 3/2007 |
| JP | 2007153574 | 6/2007 |
| JP | 2007325322 | 12/2007 |

OTHER PUBLICATIONS

Japan Patent Office Application Serial No. 2013-023273, Office Action dated Feb. 25, 2014, 3 pages.
The State Intellectual Property Office of the People's Republic of China Application Serial No. 201310050629.2, Office Action dated Nov. 3, 2014, 5 pages.
Japan Patent Office Application Serial No. 2013-023273, Office Action dated Jun. 17, 2015, 4 pages.

* cited by examiner

*Primary Examiner* — Kawing Chan
(74) *Attorney, Agent, or Firm* — Lee, Hong, Degerman, Kang & Waimey

(57) ABSTRACT

Provided is a method for controlling an inverter, the method comprising calculating an optimal speed, determining a final speed as the optimal speed when a command speed is higher than a rated speed level of a motor, and determining the final speed as the command speed when the command speed is lower than or equal to the rated speed level, or higher than a predetermined optimal speed level.

4 Claims, 6 Drawing Sheets

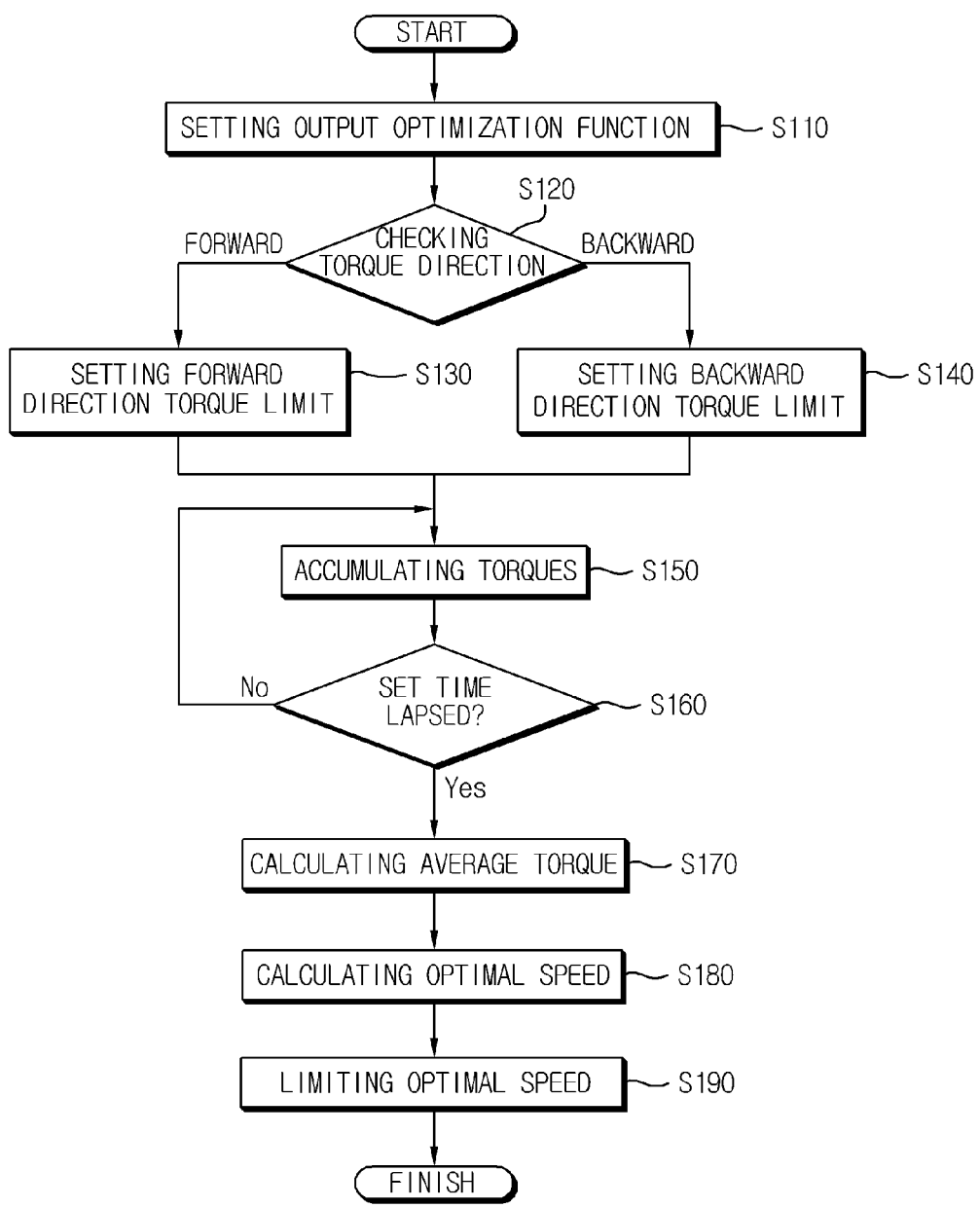

METHOD FOR CONTROLLING AN INVERTER

CROSS-REFERENCE TO RELATED APPLICATIONS

Pursuant to 35 U.S.C. §119 (a), this application claims the benefit of earlier filing date and right of priority to Korean Patent Application No. 10-2012-0013864, filed on Feb. 10, 2012, the contents of which are hereby incorporated by reference herein in their entirety.

BACKGROUND OF THE DISCLOSURE

1. Field of Endeavor

The present disclosure relates to a method for controlling an inverter.

2. Background

In general, a power inverter, or inverter, is an electrical power converter that changes DC (Direct Current) to AC (Alternating Current) at any required voltage and frequency through PWM (Pulse Width Modulation) switching operation by being connected to a three-phase commercial AC power source to generate a desired power and supplies the power to a motor, where the motor controlled by the inverter in turn generates a torque to drive a load.

In general, a load applied by a motor-driving inverter system may be largely classified to a blower load, a hoist load, a drawbar load and a tension control load. The hoist load refers to a vertically moving mechanical system such as a crane, a hoist and an elevator, and particularly the crane and the hoist vary in work efficiency in response to a driving speed of a motor. That is, in a case a motor driving a crane is operated at a maximum speed within an allowable rated scope, the crane can be enhanced in work efficiency.

FIGS. 1a and 1b are flowcharts illustrating a method for controlling an inverter according to prior art. In a conventional inverter control, an output optimization function of the inverter is set (S110). A hoist load requires a deceleration/acceleration torque (50~200%) of a torque necessary for a constant velocity operation, and in this case, a motor and a driving system must be able to supply a torque 150% more than a rated torque during the deceleration/acceleration time.

In the hoist load, torques of forward and backward directions of a motor are generated, where a torque direction is checked (S120) to set a control of a forward direction is set (S130), and to set a control of a backward direction is set (S140).

A motor must generate a forward direction torque and a backward direction torque for deceleration/acceleration of the system, and the motor must be able to change to a forward direction and a backward direction, which leads to necessity of setting a limit on forward and backward torque directions which is performed by the abovementioned S120~S140.

Thereafter, torques to load are accumulated (S150), and in a case a set time has lapsed (S160), the number of torques accumulated during the set times and accumulated torques are calculated to obtain an average torque (S170). Successively, an optimal speed is calculated using the calculated average torque, the forward and backward torque limits set up at S130 and S140, and a rated speed of the inverter (S180). Furthermore, the optimal speed calculated at S180 is limited within a maximum frequency range (S190), whereby an optimal speed can be calculated. It is assumed that an entire operation of FIG. 1a is S100 of FIG. 1b.

FIG. 1b is a flowchart illustrating a set of a final speed command of a motor. In a case an optimal speed is calculated at S100, a determination is made as to whether the optimal speed is applied as a final speed command (S210), and if the optimal speed is applied as a final speed command, the optimal speed calculated at S100 is determined as a final speed command (S220), and if the optimal speed is not applied as the final speed command, a command speed is determined as a final speed command (S230), and then a final speed is outputted (S240).

FIG. 2 is a graph illustrating a maximum torque curve of a motor speed, where 'a' refers to a region where a predetermined torque is lasted under a rated speed of a motor, and 'b' refers to a region where a predetermined torque is above the rated speed. In the figure, a torque outputtable by the motor at 'b' decreases in reverse proportion to an increased speed of the motor.

As explained above, a motor needs deceleration/acceleration torques during deceleration/acceleration operations, and in a case the motor keeps accelerating to excel the command speed while maintaining the deceleration/acceleration, the maximum speed is a speed capable of maintaining the deceleration/acceleration torques during the deceleration/acceleration, which can be expressed by the following Equation.

$$\text{(Optimal speed)} = \text{(rated speed)} \times \text{(forward or backward torque limit)}/\text{(torque load)} \quad \text{[Equation 1]}$$

An optimal speed or a command speed is set as a final speed command using the optimal speed calculated by the above Equation 1 as shown in FIG. 1b, and a final speed is outputted, whereby the output is optimized. However, referring to FIG. 2, this suffers from a disadvantage in that an optimal speed is determined through output optimization during an operation over a rated speed, and a predetermined speed is provided at an operation less than the rated speed, whereby the output optimization is impossible at the operation less than the rated speed.

Thus, there is a need to provide an apparatus for controlling an inverter capable of solving the aforementioned disadvantages or problems.

SUMMARY OF THE DISCLOSURE

This section provides a general summary of the disclosure, and is not a comprehensive disclosure of its full scope or all of its features.

Methods and systems consistent with the present disclosure provide a method for controlling an inverter configured to determine a maximum speed even at a scope less than a weak field operation area according to a load to thereby control the inverter at an optimal output.

It should be emphasized, however, that the present disclosure is not limited to a particular disclosure as explained above. It should be understood that other technical subjects not mentioned herein may be appreciated by those skilled in the art.

In one general aspect of the present disclosure, there is provided a method for controlling an inverter, the method comprising: calculating an optimal speed; determining a final speed as the optimal speed when a command speed is higher than a rated speed level of a motor; and determining the final speed as the command speed when the command speed is lower than or equal to the rated speed level, or higher than a predetermined optimal speed level.

Preferably, but not necessarily, the method may further comprise checking if the motor is in a manual mode when the command speed is lower than or equal to the optimal speed level.

Preferably, but not necessarily, the method may further comprise determining the final speed as the command speed when the motor is in a manual mode.

Preferably, but not necessarily, the method may further comprise determining the final speed as the optimal speed when the motor is not in a manual mode.

Preferably, but not necessarily, the calculating the optimal speed comprises: setting a torque limit, accumulating torques during a set time, calculating an average torque, and calculating the optimal speed using the torque limit, the average torque and the rated speed of the motor.

Preferably, but not necessarily, the optimal speed may be obtained by dividing a multiplication of the rated speed and the torque limit by the average torque.

Preferably, but not necessarily, the torque limit may include a forward direction torque limit and a backward direction torque limit.

Preferably, but not necessarily, the calculating the optimal speed may further comprise limiting the calculated optimal speed within a maximum frequency range.

The method for controlling an inverter according to exemplary embodiments of the present disclosure has an advantageous effect in that an output optimization is performed at a section over a rated speed, and an output optimization is also performed at a section less than a rated speed and at a speed level more than an optimal speed level defined by a user, whereby a motor can be driven at a maximum speed according to a load even at a section lower than a rated speed to thereby enhance a work efficiency.

Another advantageous effect is that a motor is driven on two references of a rated speed and an optimal speed level to thereby optimize a driving of the motor according to the motor and a load characteristic of the motor.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which:

FIGS. 1a and 1b are flowcharts illustrating a method for controlling an inverter according to prior art;

DETAILED DESCRIPTION

Features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Hereinafter, a method for controlling an inverter according to exemplary embodiments of the present disclosure will be described in detail with reference to the accompanying drawings.

Figure 1B:
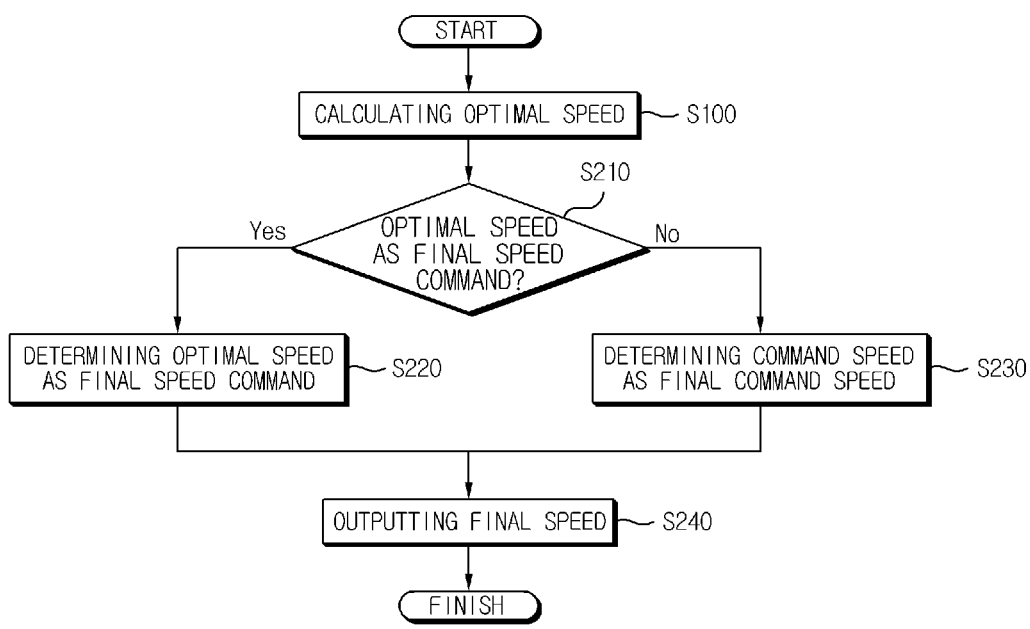
Figure 2:
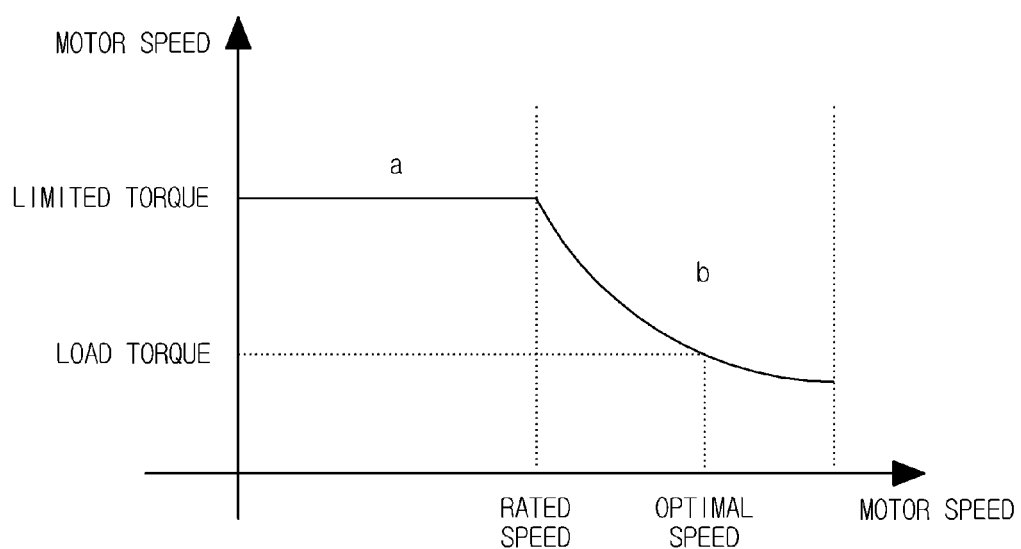
FIG. 2 is a graph illustrating a maximum torque curve of a motor speed.
Figure 3:
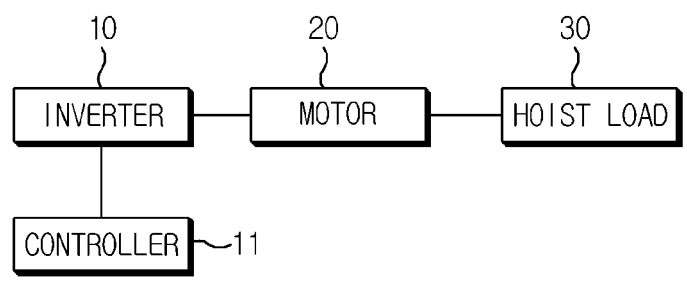
FIG. 3 is a structural view of an inverter system according to the present disclosure.

FIG. 3 is a structural view of an inverter system according to the present disclosure.

Referring to FIG. 3, an inverter (10) is to drive a motor (20) that changes DC (Direct Current) to AC (Alternating Current) at any required voltage and frequency by being connected to a three-phase commercial AC power source to generate a desired power and supplies the power to the motor (20), where the motor (20) controlled by the inverter (10) generates a torque to drive a hoist load (30), for example. However, the load is not limited to the hoist load (30) and may include a host of different types of loads. The method for controlling the inverter (10) is performed by a controller (11), which is explained in the following manner.

Figure 4:
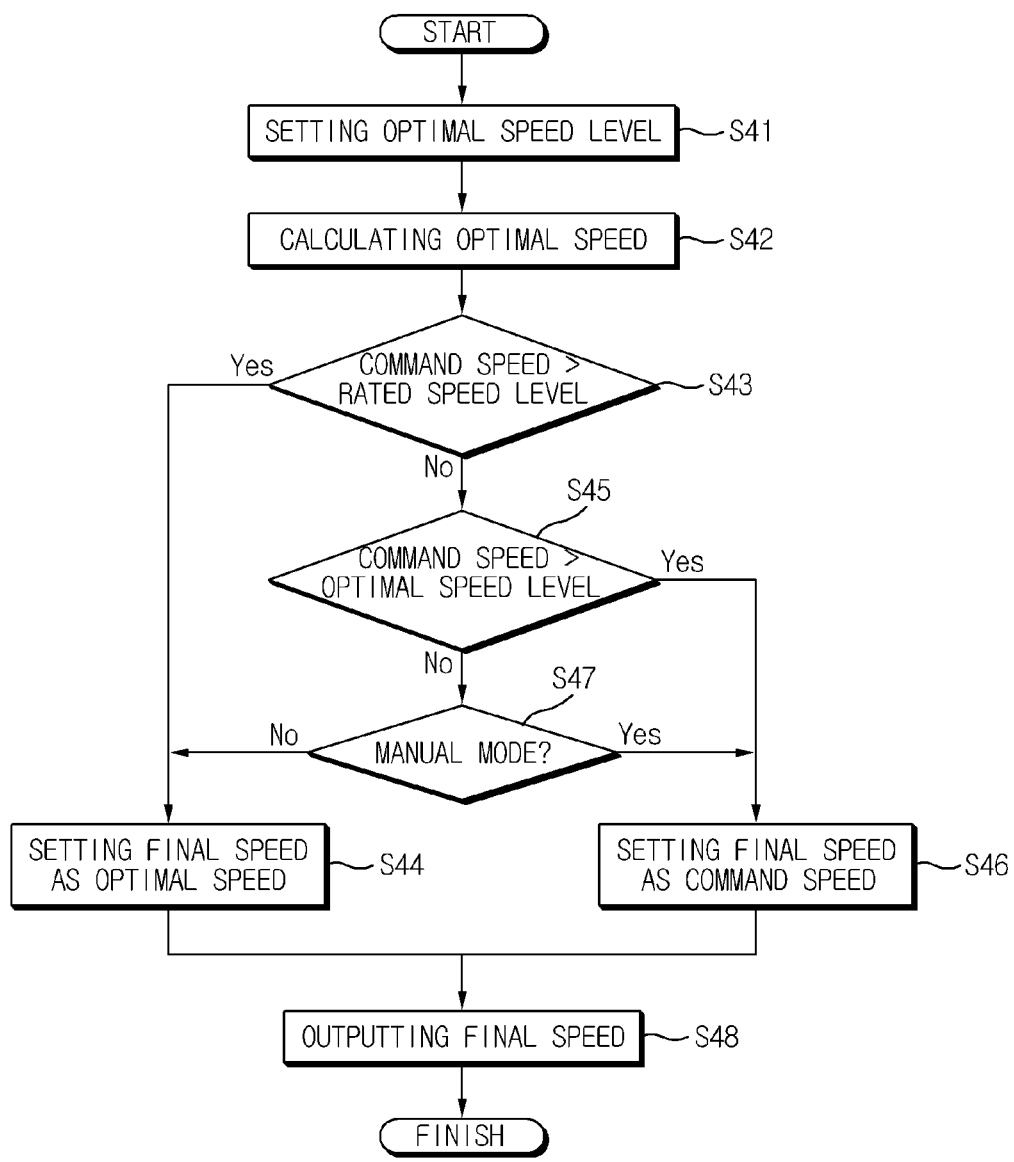
FIG. 4 is a flowchart illustrating a method for controlling an inverter according to an exemplary embodiment of the present disclosure.

FIG. 4 is a flowchart illustrating a method for controlling an inverter according to an exemplary embodiment of the present disclosure.

Referring to FIG. 4, the method for controlling an inverter comprises setting an optimal speed level defined by a user (S41). The optimal speed level in the present disclosure may be defined by the user, where the user may input the optimal speed level using an HMI (Human-Machine Interface). Successively, the controller (11) calculates an optimal speed.

Figure 5:
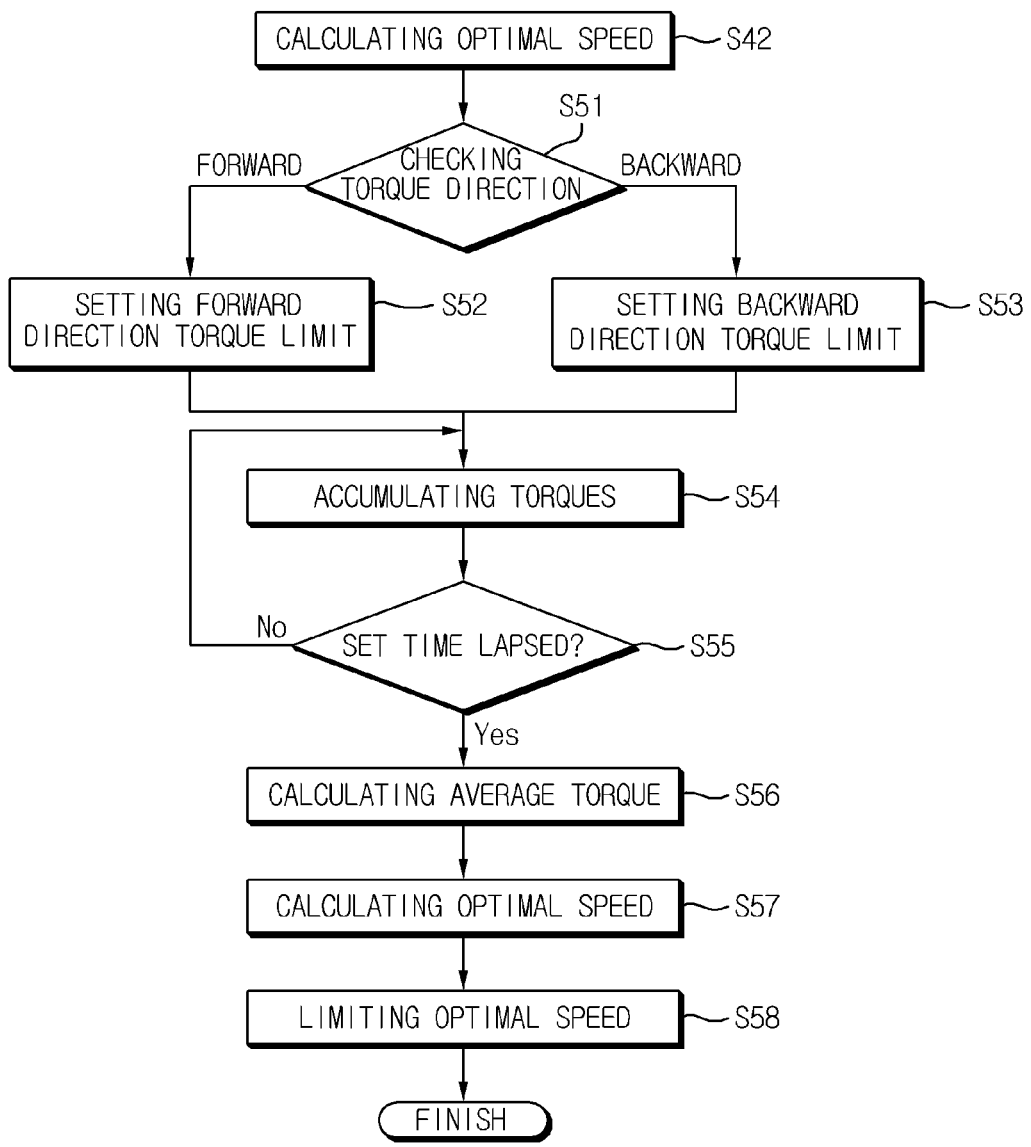
FIG. 5 is a detailed flowchart illustrating an optimal speed calculation of FIG. 4 according to an exemplary embodiment of the present disclosure.

FIG. 5 is a detailed flowchart illustrating an optimal speed calculation of FIG. 4 according to an exemplary embodiment of the present disclosure.

Referring to FIG. 5, the controller (11) checks a torque direction of the motor (20) (S51), and sets a forward direction torque limit if the torque direction is forward (S52), and sets a backward direction torque limit if the torque direction is backward (S53). Thereafter, the controller (11) accumulates the torques (S54) for a set predetermined period (S55) to calculate an average torque using the number of torques accumulated for the set predetermined period and the accumulated torques (S56).

Then, an optimal speed is calculated (S57) as in Equation 1, using the average torque calculated in S56, the forward direction torque limit, the backward direction torque limit and a rated speed of the motor (20) (S57). Furthermore, the calculated optimal speed is limited to within a maximum frequency range (S58).

Referring to FIG. 4 again, the controller (11) compares an inputted command speed of the motor (20) with a rated speed level (S43) to set a final speed as an optimal speed (S44), in a case the command speed is higher than the rated speed level.

If the command speed is lower than or equal to the rated speed level at S43, the controller (11) compares the command speed of the motor (20) with an optimal speed level (S45) to set the final speed as the command speed (S46), in a case the command speed is higher than the optimal speed level.

If the command speed is lower than or equal to the optimal speed level at S45, the controller (11) checks if the inverter (10) is in manual mode (S47), and sets the final speed as the command speed (S46) in case of being in the manual mode, and sets the final speed as the optimal speed (S45) in case of not being in the manual mode. Then, the controller (11) outputs the final speed as a speed command (S48).

Figure 6:
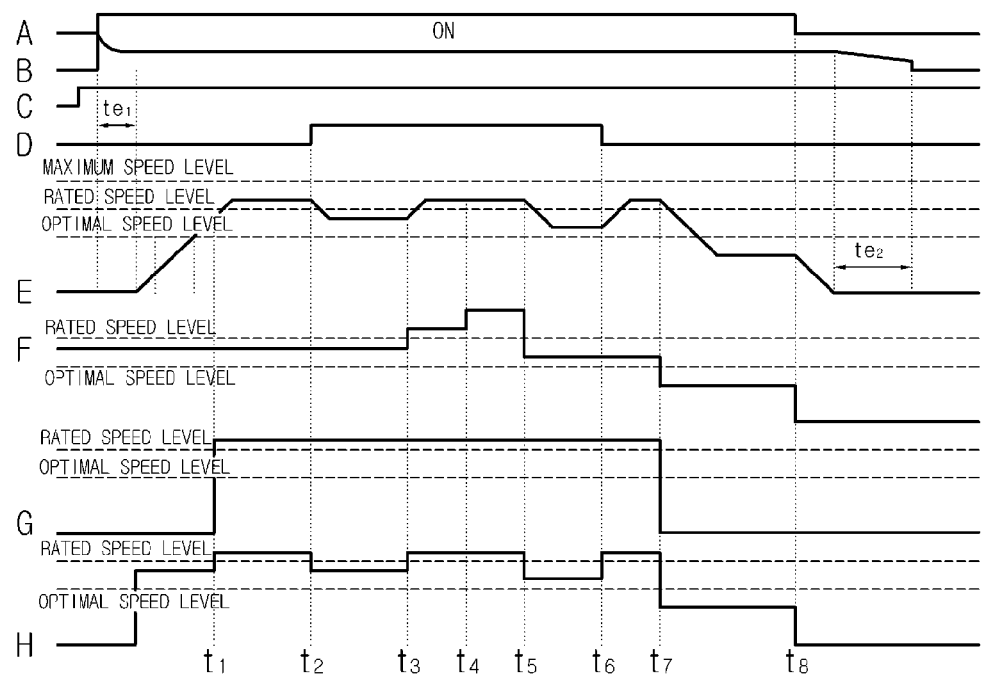
FIG. 6 is a schematic view illustrating a control sequence according to an exemplary embodiment of the present disclosure.

FIG. 6 is a schematic view illustrating a control sequence according to an exemplary embodiment of the present disclosure, where a hoist of a crane is used as a hoist load (30).

Referring to FIG. 6, 'A' refers to an operation command signal showing an operation status of the motor (20), 'B' refers to an excitation current signal showing a waveform of an excitation current, 'C' refers to an unlock/lock signal showing if a hoist rope is fixed to a container by a spreader of the crane being hitched at a latch of the container, 'D' refers to a manual mode signal showing that a user has switched a control mode to a manual mode, 'E' refers to a motor speed showing an operation speed of the motor (20), 'F' refers to a command speed from outside, 'G' refers to an optimal speed calculated in FIG. 5, and 'H' refers to a final speed selected in FIG. 4.

Furthermore, 'a' refers to a time required for magnetization of the motor (20), 'b' refers to a section where an excitation current is maintained, and 'c' refers to a section where load torques are accumulated for calculating an optimal speed (S54).

Meanwhile, t1 to t8 are defined by sequent operation, where t1 is a time when an optimal speed is calculated, t2 is a time when the user applies a signal for manual mode, t3 is a time when a command speed becomes greater than a rated speed level, t4 is a time when the command speed becomes greater than the command speed of t3, t5 is a time when the command speed becomes smaller than a rated speed level, t6 is a time when the manual mode is turned off, t7 is a time when the command speed becomes smaller than an optimal speed level, and t8 is a time when the operation command signal of the motor (20) is turned off.

In a case the spreader of the crane is hitched at the latch of the container to allow the hoist rope to be secured to the container, the unlock/lock signal of 'C' is turned on, and in a case the operation command signal of 'A' is inputted, the excitation current signal of 'B' is applied to excite the motor (20) for an 'a' section. A motor speed of 'E' gradually increases with the outside command speed of 'F' as a final speed. The accumulation of load torques at S54 is performed for a 'C' section, which is approximately 0.20~0.25 seconds before reaching an optimal speed level.

In a case the load torque accumulation is completed, the final speed is calculated at t1, which is reflected on the optimal speed graph of 'G'. Thereafter, the motor speed is driven using the optimal speed as the final speed command.

In a case a manual mode signal is applied at t2, the motor is driven with the command speed set as the final speed, because the command speed is lower than the rated speed level but higher than the optimal speed level at S43, S45 and S47.

The motor (20) is driven with the optimal speed set as the final speed, because the command speed is higher than the rated speed level at t3 and t4. The motor (20) is driven with the command speed set as the final speed, because the command speed is lower than the rated speed level, but higher than the optimal speed level at t5.

The motor (20) is driven with the optimal speed set as the final speed, because the command speed is lower than the rated speed level at t6 according to S43, S45 and S47, and the manual mode is turned off.

The motor (20) is driven with the command speed set as the final speed, because the command speed is lower than the optimal speed level at t7 according to S43, S45 and S47.

As apparent from the foregoing, the present disclosure can enhance the work efficiency by performing an output optimization even at a section more than a rated speed, by performing an output optimization at a level more than an optimal speed level defined by a user, even at a section less than a rated speed and by driving a motor at a maximum speed in response to a load even at a section lower than the rated speed.

Furthermore, the motor is driven based on two references of a rated speed and an optimal speed level, whereby the motor driving can be optimized in response to the motor and load characteristic.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling an inverter that supplies power to a motor, the method performed by a controller and comprising:
   determining if the motor is in a manual mode;
   calculating an optimal speed;
   determining a final speed as the optimal speed both when a command speed is higher than a rated speed level of the motor and when the motor is not in the manual mode and the command speed is lower than or equal to both the rated speed level and a predetermined optimal speed level;
   determining the final speed as the command speed both when the motor is in the manual mode and the command speed is lower than or equal to both the rated speed level and the predetermined optimal speed level and when the command speed is lower than or equal to the rated speed level and higher than the predetermined optimal speed level; and
   supplying the determined final speed to the inverter,
   wherein calculating the optimal speed comprises:
   setting a torque limit;
   accumulating torques during a set time;
   calculating an average of the accumulated torques; and
   calculating the optimal speed using the set torque limit, the calculated average of the accumulated torques and the rated speed level.

2. The method of claim 1, wherein calculating the optimal speed further comprises dividing a multiplication of the rated speed level and the set torque limit by the calculated average of the accumulated torques.

3. The method of claim 1, wherein the set torque limit includes a forward direction torque limit and a backward direction torque limit.

4. The method of claim 1, further comprising limiting the calculated optimal speed within a maximum frequency range.

* * * * *